United States Patent [19]

Suzuki et al.

[11] Patent Number: 5,575,352
[45] Date of Patent: Nov. 19, 1996

[54] FOUR-WHEELED VEHICLE

[75] Inventors: Takashi Suzuki; Eiji Kato, both of Iwata, Japan

[73] Assignee: Yamaha Hatsudoki Kabushiki Kaisha, Iwata, Japan

[21] Appl. No.: 428,017

[22] Filed: Apr. 25, 1995

[30] Foreign Application Priority Data

Apr. 26, 1994 [JP] Japan .................... 6-88216

[51] Int. Cl.⁶ ............................... B60K 13/04
[52] U.S. Cl. .................. 180/311; 180/309; 180/908; 280/702
[58] Field of Search .................... 180/311, 312, 180/309, 233, 210, 215, 217, 291, 908; 280/702, 709, 711

[56] References Cited

U.S. PATENT DOCUMENTS

| | | | |
|---|---|---|---|
| 4,592,441 | 6/1986 | Marier et al. | 180/217 |
| 4,730,689 | 3/1988 | Takahashi et al. | 180/215 |
| 4,735,275 | 4/1988 | Tsukahara et al. | 180/215 |
| 4,757,872 | 7/1988 | Inomata | 180/309 X |

FOREIGN PATENT DOCUMENTS

| | | | |
|---|---|---|---|
| 60-213577 | 10/1985 | Japan | 180/311 |
| 3-9160 | 1/1991 | Japan | 180/311 |
| 5-58371 | 3/1993 | Japan | 180/311 |

*Primary Examiner*—Kevin Hurley
*Attorney, Agent, or Firm*—Knobbe, Martens, Olson & Bear

[57] ABSTRACT

Two embodiments of compact four-wheel vehicles adapted to accommodate a rider seated primarily in straddle-fashion on a seat that is disposed at least in part above the engine and the final drive for the rear wheel. The frame assembly is compact so as to permit placement of the engine and transmission for driving the wheels between the frame and for protecting the rider's legs therefrom. Both two-wheel and four-wheel drive embodiments are depicted.

30 Claims, 6 Drawing Sheets

FOUR-WHEELED VEHICLE

BACKGROUND OF THE INVENTION

This invention relates to a four-wheeled vehicle and more particularly to an improved and compact four-wheeled vehicle.

There is a type of four-wheeled vehicle that is quite popular for off-the-road use and which is designed to rely primarily upon motorcycle components. This type of vehicle normally has a straddle-type seat that accommodates either the rider/operator or the rider/operator and one or more passengers seated in tandem fashion. As a result of this configuration, the frame for the vehicle must be relatively narrow, particularly in the area where the rider and passengers are seated.

On the other hand, it is also very desirable that the major running components for the vehicle be positioned within the frame construction so that they will be protected. In addition, this inward placement not only protects the running component, but also assists in assuring that the operator and riders will not contact any of the running component. However, this is difficult to attain with conventional frame, engine and transmission arrangements.

It is, therefore, a principal object of this invention to provide an improved frame and drive construction for a four-wheeled vehicle of this type.

It is a further object of this invention to provide an improved and compact frame and propulsion unit system for a four-wheeled vehicle of this type.

It is a still further object of this invention to provide an improved and compact frame and propulsion unit system wherein the propulsion unit is disposed substantially primarily between and inwardly of the frame elements.

It is a still further object of this invention to provide an improved frame for a four-wheeled vehicle.

SUMMARY OF THE INVENTION

A first feature of this invention is adapted to be embodied in a drive arrangement for a four-wheeled vehicle comprised of a generally open tubular frame having a longitudinally extending center line. A pair of dirigible front wheels are suspended by the frame at the forward end thereof. A pair of rear wheels are suspended by the frame at the rear end thereof. The rear wheel suspension comprises a single suspension element having a center line of action which is offset to one side of the longitudinally extending center line of the frame. An engine is mounted in the frame and drives a drive shaft that is disposed on the other side of the longitudinally extending center line. A final drive is provided for transferring drive from the drive shaft to the pair of rear wheels.

Another feature of the invention is adapted to be embodied in a frame for a vehicle of the type described in the preceding paragraph. This frame is comprised of a pair of spaced-apart lower tubes that extend generally parallel to each other from the front of the frame and diverge outwardly toward the rear of the frame and terminate before the rear axle. At their rear termination these lower tubes are bent upwardly. A pair of upper frame tubes having generally inverted U-configuration are fixed at their forward and rearward ends to the lower tubes. The rear connection of the upper tubes is to the upward portions of the lower tubes. A plurality of cross members interconnect the tubes for reinforcing purposes.

DETAILED DESCRIPTION OF THE PREFERRED EMBODIMENTS OF THE INVENTION

Figure 1:
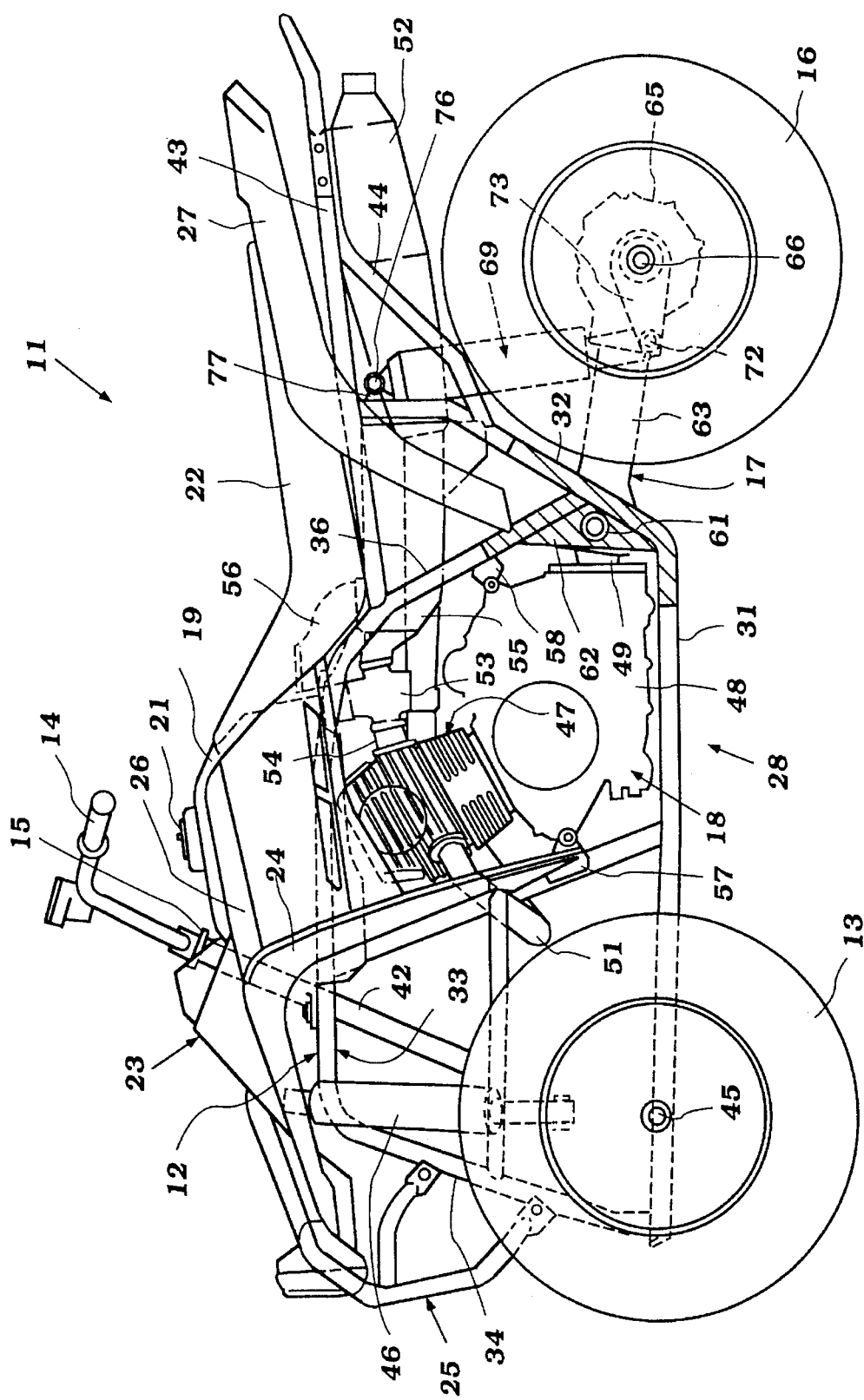
FIG. 1 is a side elevational view of a four-wheeled vehicle constructed in accordance with a first embodiment of the invention.
Figure 2:
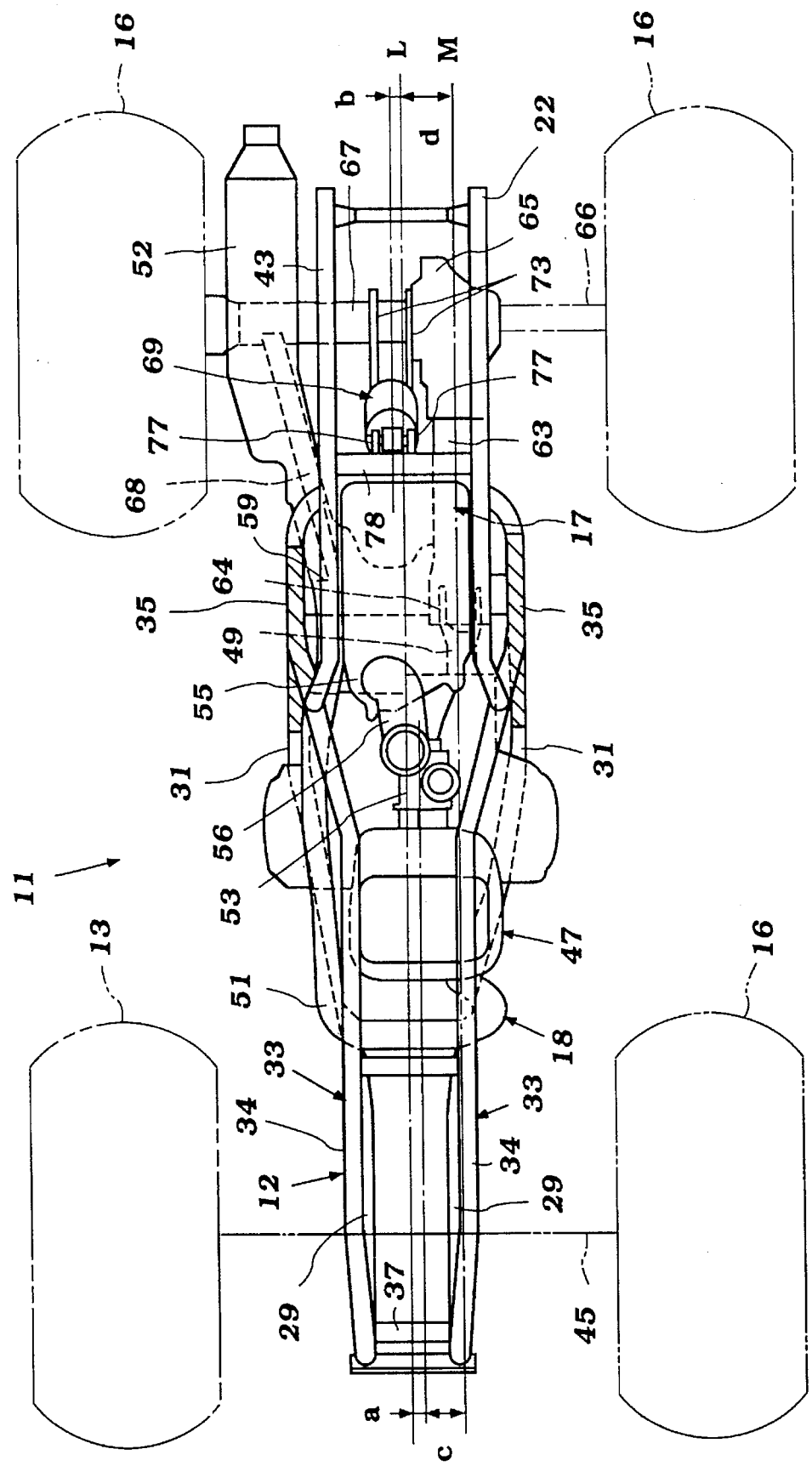
FIG. 2 is a top plan view thereof, with the axles, wheels, and front-wheel suspension either shown in phantom or not illustrated at all.
Figure 3:
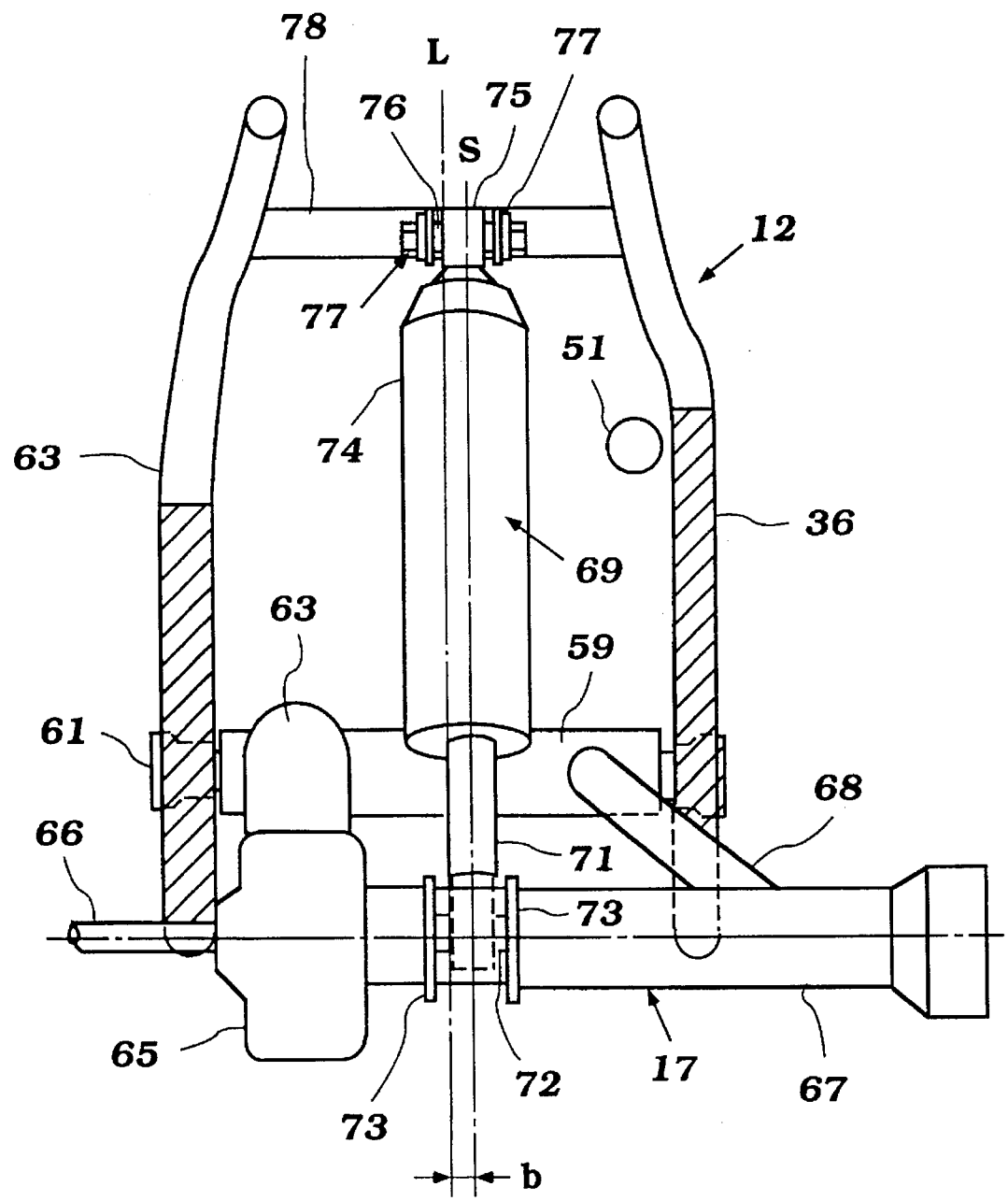
FIG. 3 is an enlarged rear elevational view showing the rear-wheel suspension and the components associated therewith, with the wheels, tires and other components deleted to more clearly show the suspension unit.

Referring now in detail to the drawings and first to the embodiment of FIGS. 1–3, a four-wheeled vehicle constructed in accordance with this embodiment is identified generally by the reference numeral 11. The vehicle 11 is comprised of a frame assembly, indicated generally by the reference numeral 12. The frame assembly 12, as will be described, is of a welded-up construction consisting primarily of tubular elements. A pair of dirigible front wheels 13 are suspended at the front end of the frame 12 in a manner which will be described and are adapted to be steered by a handlebar assembly 14 that is journaled on a head pipe 15 of the frame assembly 12.

A pair of rear wheels 16 are supported at the rear end of the frame 12 by means including a trailing arm assembly 17 in a manner which will be more fully described later.

A propulsion unit, indicated generally by the reference numeral 18, is suspended, in a manner which will be described, in the frame 12 and drives the rear wheels 16 in a manner which will also be described. A fuel tank 19 for supplying fuel to the propulsion unit 18 is supported in a frame 12 above the propulsion unit 18 and to the rear of the head pipe 14. A filler cap 21 affords access for filling the fuel tank 19.

A seat 22 is disposed behind and in partially overlying relationship to the fuel tank 19. A rider/operator seated on the seat 22 can steer the vehicle by turning the handlebar assembly 12, as is well known in this art. Other vehicle controls, such as throttle and transmission controls of any known type, are also provided.

A front body cover 23, including a pair of front fenders 24, is mounted on the frame 12, or more particularly mounted in part on a bumper assembly 25, which is detachably connected to the frame 12. A central part 26 of the body portion 23 surrounds the fuel tank 19, although it has an opening in its upper surface to access the fill cap neck 21.

A pair of rear fenders 27 are also mounted by the frame assembly 12 and overlie the rear wheels 16.

The frame assembly 12 is comprised of a pair of lower tubes, indicated generally by the reference numerals 28. The tubes 28 are disposed on opposite sides of a longitudinal center line or plane L, indicated in FIGS. 2 and 3 of the drawings. These lower tubes 28 have first forward portions 29 that are spaced apart relatively closely to the center plane L, but which diverge to outer portions 31, which are parallel to the forward portions 29 but spaced further outwardly from the center plane L in the area beneath the propulsion unit 18 and the forward portion of the seat 22. At the rear ends, these portions 31 are turned upwardly, as at 32, and extend in a longitudinal position that is forwardly of the rear wheel 16, but then rearwardly but still forward of the wheel centers.

The frame further includes a pair of upper or main frame tubes, indicated generally by the reference numeral 33, each of which has a generally inverted U-shape in side elevation and which also have forward portions 34 that extend generally parallel to each other and slightly outwardly from the center plane L from the lower tube portions 29. At their rear ends the main tubes 33 flare outwardly, as at 35, and then bend downwardly at 36 for connection, by welding, to the lower tube portions 32. The forward ends 34 of the main frame tubes 33 are likewise welded to the forward ends of the lower tube portions 29.

A plurality of transversely extending cross members 37 and 38 are welded across the main frame tubes 34 adjacent their forward ends for further stiffening. In addition, longitudinally extending reinforcing tubes 39 extend rearwardly from the portions 34 of the main tubes 33 and are connected to a vertically extending tube 41, which provides support for the head pipe 15 and handlebar assembly 14. The handlebar assembly 14 is connected to a steering shaft 42 which is, in turn, connected in an appropriate manner to the front wheels 13 for steering of them.

A pair of seat rails 43 extend rearwardly from the point where the main frame members 33 turn down at their portion 36 for supporting the seat 22. In addition, the seat rails 43 are welded to the upper ends of the lower tube portions 32, and additional back stays 44 are welded there between so as to ensure a rigid frame assembly. It should be noted that this frame assembly is maintained quite narrow in configuration.

The suspension for the front wheels 13 may be of any known type, and for that reason it is not illustrated in any detail in this embodiment. However, the front wheels 13 are supported upon axles 45, which may be either independent or of a beam type depending upon whether an independent or non-independent front suspension is employed. In either event, a pair of combined shock absorber spring assemblies 46 are loaded between this front suspension for the axles 45 and wheels 13 and the frame assembly 12. As has been noted, the steering shaft 42 is connected to the front wheels 13 for their steering in any appropriate manner.

The frame assembly 12 as thus far described is very rigid, but leaves a large open central area in which the propulsion unit 18 is provided. The propulsion unit 18 includes an internal combustion engine, indicated generally by the reference numeral 47, which, in the illustrated embodiment, is of the single-cylinder air-cooled type. The engine 47 has a combined crankcase change speed transmission assembly 48, which thus forms part of the engine 47. This change-speed transmission drives an output shaft, which appears partially in the figures and which is identified generally by the reference numeral 49. The output shaft 49 extends from one side of the crankcase transmission assembly 48 at a distance d from the central plane L and rotates about an axis defined by the dot-dash line M in FIG. 2. It should be noted that this offsetting permits the transmissions output shaft 49 and the drive shaft to be described later, which it drives, within the confines of the frame 12 so that it will be well protected thereby. In addition, this places the drive inwardly of the rider's legs when the rider is seated on the seat 22.

The engine 46 has a forwardly facing exhaust port to which one end of an exhaust pipe 51 is connected. The exhaust pipe 51 extends forwardly and passes around the frame tube 41 and then exits outwardly beyond the side of the frame at its narrow forward portion, but passes inwardly of the outer frame parts 31 and 35 in the area beneath the rider so that the rider's legs will be protected. This exhaust pipe then terminates in a muffler 52 that is disposed slightly outwardly of the seat rails 43 but within the area between them and the rear wheel 16 so as to provide a compact assembly and yet one which will ensure that the rider and any passengers are protected.

A carburetor 53 is disposed to the rear of the engine 47 and supplies a fuel-air mixture to its intake port through a short manifold pipe 54. The carburetor 53 receives fuel from the fuel tank 19, as aforenoted. Air for the carburetor 53 is drawn from an air silencer and filter assembly 55 that is positioned beneath the seat 22 and which has a snorkel-type air inlet pipe 56 that extends upwardly and beneath the seat 22 so as to receive air, but which is protected so as to ensure against the ingestion of foreign material.

The propulsion unit 18 is suspended by the frame 12 by a front engine mount 57 that is welded to the frame tube 43 and a pair of rear engine mounts 58 that are welded to the downwardly extending portions 36 of the main frame tubes 33. Additional supports may also be employed, if desired. The center of the engine 47 is offset a distance a from the center plane L on the same side as the output shaft 49 and drive shaft axis M. The distance a is less, however, than the distance d.

Turning now to the description of the rear trailing arm assembly 17, this includes a front cross tube 59 which is supported on a pivot member 61. The pivot member 61 is, in turn, carried by a pair of brackets 62 that are welded to the frame 12 adjacent the area where the frame member portions 36 and 32 are joined to each other. A drive shaft housing tube 63 is affixed to the cross tube 59 on the same side as the transmission output shaft 49. The transmission output shaft 49 is connected through a yoke 64 of a universal joint (not otherwise shown in this embodiment) 64 to a drive shaft that is rotatably journalled within the tube 63. The drive shaft tube 63 terminates in a final drive housing 65 in which a ring and pinion (not shown) is provided for driving a rear axle 66. If desired, this final drive may include a differential mechanism of any known type.

Continuing to describe the trailing arm construction 17, it also includes an axle shaft tube 67 which extends from the final drive housing 65 across the center plane L toward the other rear wheel 16. A separate axle shaft like the axle shaft 66 may be drivingly connected to the remaining rear wheel 16 if the final drive 65 contains a differential. If not, the axle shaft 66 extends transversely across through the tube 67 and is drivingly connected to the remaining rear wheel 16.

Finally, a diagonally extending tube 68 is welded between the tube 59 and the axle tube 67 so as to complete the trailing arm assembly 17.

The pivotal movement of the trailing arm 17 about the pivot axis defined by the pivot shaft 61 is controlled by a suspension element, indicated generally by the reference numeral 69, and which may comprise a tubular-type shock absorber and surrounding coil spring. This suspension element 69 has a line of action S which is offset from the center plane L at a distance b and to the side opposite that of the drive shaft axis M. The amount of this offset is, however, substantially less than that offset d of the drive shaft axis M.

The suspension element 69 includes a piston rod 71 that is connected by means of a pin 72 to a pair of brackets 73 that are welded to the axle tube 67. The outer housing 74 of the suspension element 69 has a trunnion 75 that is pivotally connected to a pivot pin 76. The pivot pin 76 is in turn carried by a pair of suspension brackets 77 that are connected to a reinforcing cross tube 78 that is welded to the upper ends of the lower tube upstanding portions 32. This joint is near where these arm upstanding portions 32 join the seat rail 43 so as to offer added rigidity.

Thus, it should be readily apparent that this embodiment provides a very compact frame assembly, and yet one which is rigid and which confines all of the main components of the propulsion unit 18 and the final drive. In addition, these components are protected themselves by the frame assembly, and the rider's legs will be precluded from coming into contact with these components.

The embodiment of the invention as thus far described has provided a drive for only the rear wheels. However, the invention and the frame construction as thus far described may be also employed in conjunction with a four wheel drive vehicle, and such a vehicle is shown in FIGS. 4–6 and is identified generally by the reference numeral 101.

The construction of the frame of this embodiment and the drive for the rear wheel is of the type previously described. For that reason, where components are the same or substantially the same, they have been identified by the same reference numerals and will not be described again. However, this embodiment does show the drive shaft for the final drive 65, and this is indicated by the reference numeral 102 in these figures. Also, the complete universal joint for driving the drive shaft 102 is also shown, in addition to the yolk 64 of the previously described embodiment, and this universal joint is indicated generally by the reference numeral 103.

These figures also show the full detail for the front wheel suspension, which may be employed with the embodiment previously described but which is not illustrated in those figures. As has been noted, the front wheels 13 of the previous embodiment may be connected to a beam-type axle, if desired.

Figure 4:
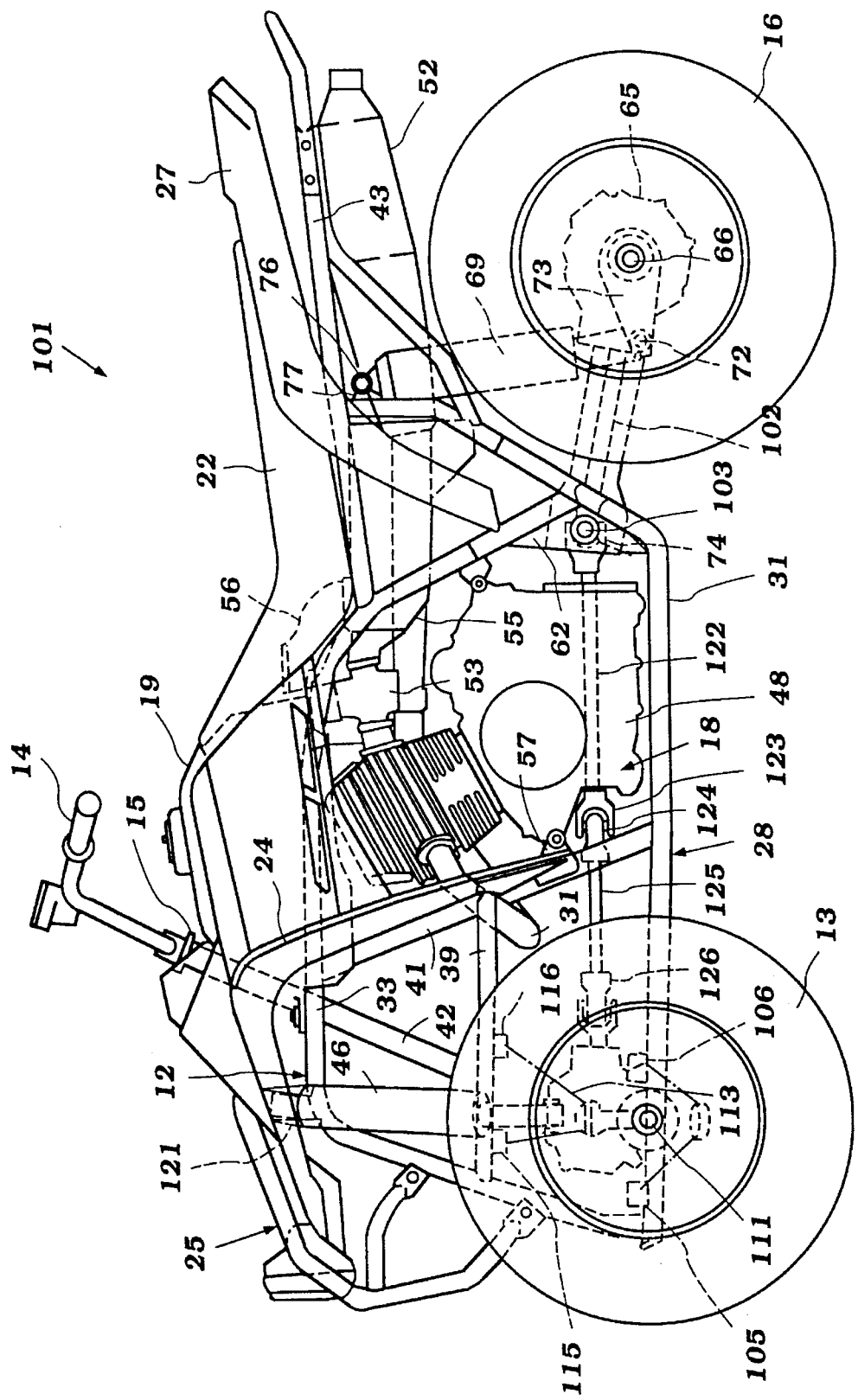
FIG. 4 is a side elevational view, in part similar to FIG. 1, and shows a second embodiment of the invention.
Figure 5:
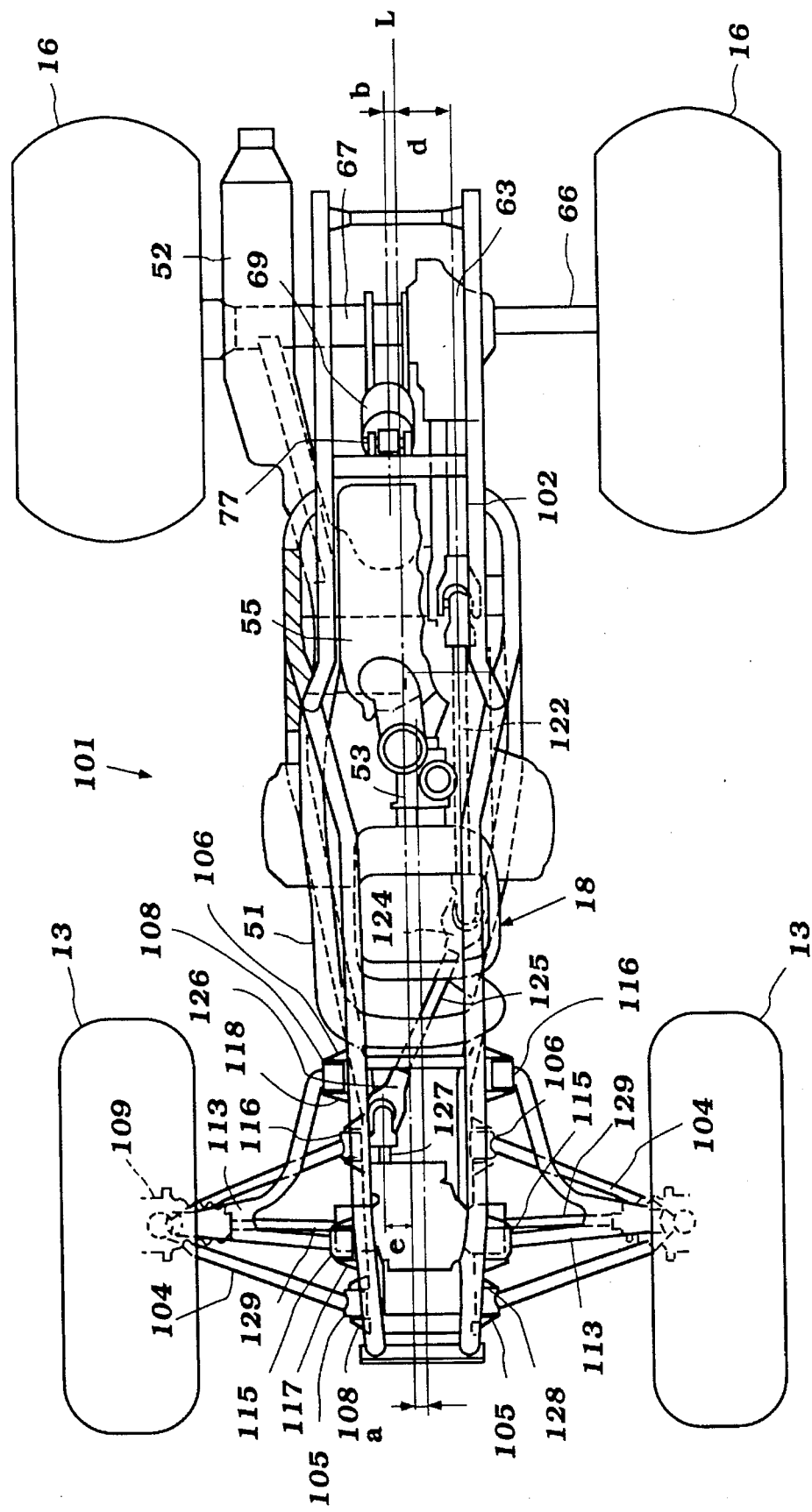
FIG. 5 is a top plan view, in part similar to FIG. 2, but of this embodiment.
Figure 6:
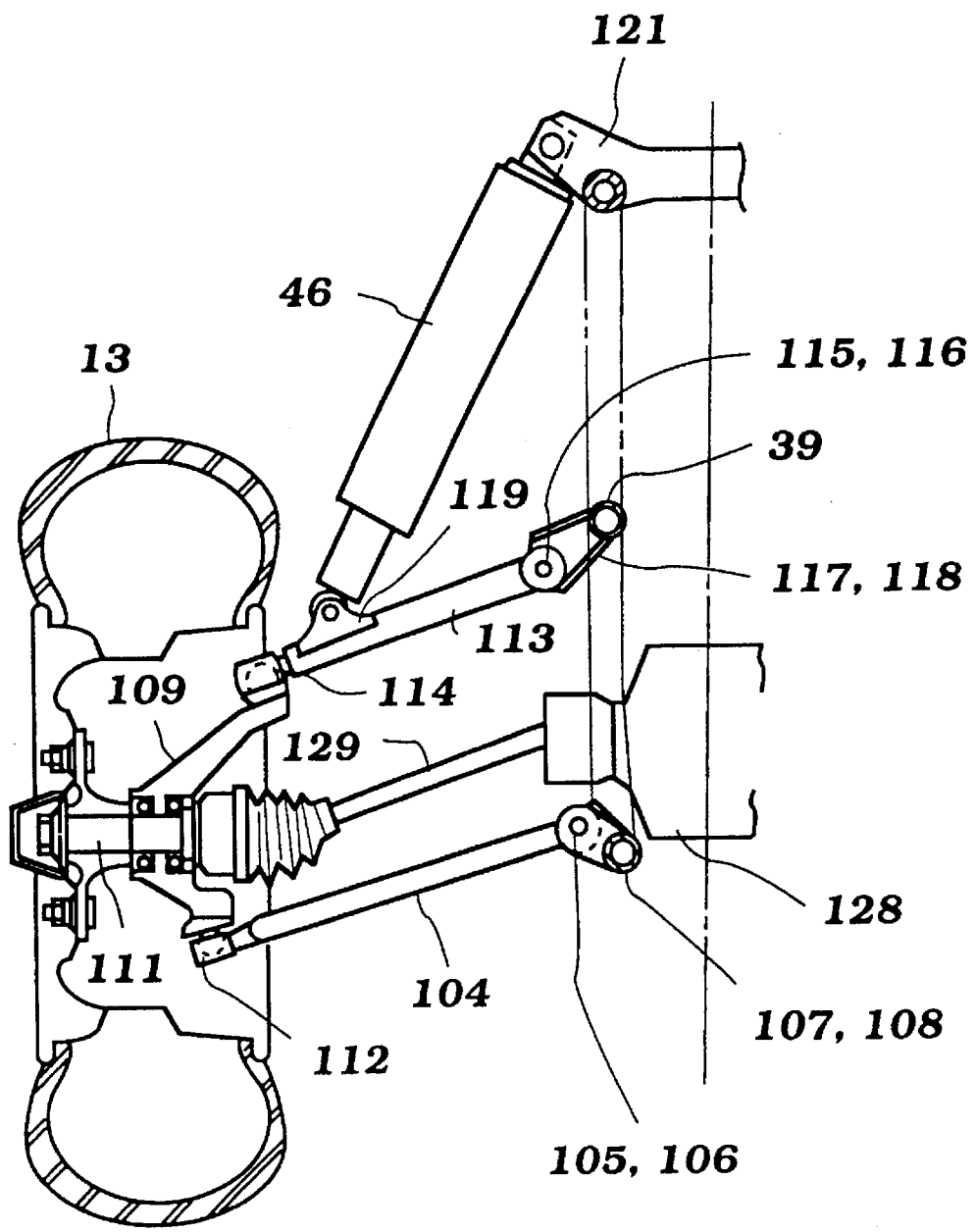
FIG. 6 is a partial front elevational view showing one of the front-wheel suspensions of the second embodiment, with the wheel and tire being shown in section.

Referring first to the suspension for the front wheels 13, this is shown in most detail in FIGS. 5 and 6, but it also appears at least schematically in FIG. 4. The suspension is of the independent type embodying a double-wishbone construction. This consists of a lower wishbone member 104 which has a generally V shape, with its inner ends carrying trunnions 105 and 106 that are supported on respective brackets 107 and 108 that are affixed to the front ends of the lower frame tube 28. The outer end of the lower arm 104 is connected by a pivot joint of the spherical type to a hub carrier 109 journalled an axle 111 on which the wheel and front tire 103 are connected. This joint is shown in FIG. 6 and identified by the reference numeral 112.

The upper arm 113 also has a spherical joint connection 114 to the hub carrier 109. These spherical connections 112 and 114 permitting steering movement of the wheel 113 in a well-known manner. The inner ends of the upper arm 113 have trunnion portions 115 and 116 that are connected to brackets 117 and 118 fixed to the frame cross tube 39.

As may be seen best in FIG. 6, the suspension unit 46 has its piston rod pivotally connected to a bracket 119 fixed to the upper arm 113. The upper end of the suspension element 46 is pivotally connected to a bracket 121, which is carried by the upper ends of the frame members 33.

In this embodiment the transmission output shaft, indicated generally by the reference numeral 122, not only extends through the rear of the transmission crankcase assembly 48 where it is connected to the universal joint 103 by the yoke 74, but also extends forwardly through this case.

A yoke 123 of a universal joint 124 is connected to the output shaft 122 to transfer drive through an intermediate shaft 125 and further universal joint 126 to the input shaft 127 of a front wheel final drive 128. It should be noted that the front wheel input shaft 127 is offset from the longitudinal center plane L on the same side as the rear suspension element 69, but at a greater distance e. The center of the transfer drive 128 is poritioned on this plane. The front wheel final drive 128 preferably includes a differential and drives a pair of drive shafts 129 through constant velocity universal joints of any known type. The opposite ends of the drive shafts 129 are coupled to the axle shafts 111 so as to drive them and the attached front wheel 13.

Thus, even though the vehicle 101 is very compact, it, like the previously described embodiment, places all of the major driving components inside the sides of the very narrow frame assembly 112.

It should be readily apparent to those skilled in the art that the foregoing description is that of preferred embodiments of the invention, and various changes and modifications may be made without departing from the spirit and scope of the invention as defined by the appended claims.

We claim:

1. A four-wheel vehicle comprised of a generally open tubular frame having a longitudinally extending center plane, a pair of dirigible front wheels supported by said frame at the forward end thereof, a pair of rear wheels, a rear wheel suspension suspending said pair of rear wheels said frame at a rear end thereof, said center plane being positioned equidistantly from and between the wheels of the pairs, said rear wheel suspension comprising a single suspension element having a center line of action offset to one side of said longitudinally extending center plane, an engine mounted in said frame and driving a drive shaft disposed on the other side of said longitudinally extending center plane, and a final drive for transferring drive from said drive shaft to said rear wheels.

2. A four-wheel vehicle as set forth in claim 1, wherein the rear wheel suspension comprises a single trailing arm for both of said rear wheels and pivotally supported on said frame assembly.

3. A four-wheel vehicle as set forth in claim 2, wherein the trailing arm includes a tubular member in which the drive shaft is rotatably journaled and which forms one tubular portion of the trailing arm.

4. A four-wheel vehicle as set forth in claim 3, wherein the trailing arm further includes a second tubular member fixed at its front end to a common member with the first-mentioned tubular member and at its rear end to an axle shaft housing that is affixed to the housing of the final drive.

5. A four-wheel vehicle as set forth in claim 1, wherein the frame has a pair of tubular side members.

6. A four-wheel vehicle as set forth in claim 5, wherein the drive shaft and the final drive are disposed substantially inwardly toward the longitudinally extending center plane from the frame tubular side members.

7. A four-wheel vehicle as set forth in claim 6, wherein the engine is also positioned in substantial part between the frame tubular side members.

8. A four-wheel vehicle as set forth in claim 7, wherein the engine is a single cylinder engine having its cylinder bore offset to the same side of the longitudinal center plane as the drive shaft.

9. A four-wheel vehicle as set forth in claim 5, wherein the engine is also positioned in substantial part between the tubular frame members.

10. A four-wheel vehicle as set forth in claim 9, wherein the engine is a single cylinder engine having its cylinder bore offset to the same side of the longitudinal center plane as the drive shaft.

11. A four-wheel vehicle as set forth in claim 5, wherein the pair of frame tubular side members comprise lower frame members and further including a pair of upper generally inverted U-shaped tubular main frame members fixed at their ends to said lower frame members.

12. A four-wheel vehicle as set forth in claim 11, further including reinforcing cross-members fixed to the tubular frame members and supporting a steering shaft disposed centrally on the longitudinal center plane for steering the front wheels.

13. A four-wheel vehicle as set forth in claim 12, further including a saddle-type seat supported at the rear of the frame assembly and in part between the rear wheels.

14. A four-wheel vehicle as set forth in claim 13, wherein the rear wheel suspension comprises a single trailing arm assembly for both of said rear wheels and pivotally supported on said frame assembly.

15. A four-wheel vehicle as set forth in claim 14, wherein the trailing arm includes a tubular member in which the drive shaft is rotatably journaled and which forms one tubular portion of the trailing arm.

16. A four-wheel vehicle as set forth in claim 15, further including a second tubular member fixed at its front end to a common member with the first-mentioned tubular member and at its rear end to an axle shaft housing that is affixed to the final drive housing.

17. A four-wheel vehicle as set forth in claim 12, wherein the engine is positioned to the rear of the steering shaft.

18. A four-wheel vehicle as set forth in claim 17, wherein the engine has an exhaust pipe extending forwardly around at least one of the cross-members and crossing over to the opposite side of the frame and extending rearwardly therealong.

19. A four-wheel vehicle as set forth in claim 18, wherein the exhaust pipe discharge is to the atmosphere on one side of the frame assembly.

20. A four-wheel vehicle as set forth in claim 19, wherein the one side of the frame assembly at which the exhaust pipe discharges is the side on the one side of the longitudinally extending center plane.

21. A four-wheel vehicle as set forth in claim 1, further including means for driving the front wheels from the engine.

22. A four-wheel vehicle as set forth in claim 21, wherein the engine has a combined crankcase transmission assembly that includes a transmission output shaft which extends parallel to the longitudinally extending center line and is in line with the first mentioned drive shaft and which drives the front wheels from the other end thereof through a second drive shaft.

23. A four-wheel vehicle as set forth in claim 22, wherein the second drive shaft extends transversely across the frame and drives a front wheel final drive disposed at the front of the frame assembly.

24. A four-wheel vehicle as set forth in claim 23, wherein the front wheel final drive has an input shaft disposed on the one side of the longitudinally extending center line.

25. A four-wheel vehicle as set forth in claim 24, wherein the rear wheel suspension comprises a single trailing arm assembly for both of said rear wheels and pivotally supported on said frame assembly.

26. A four-wheel vehicle as set forth in claim 25, wherein the trailing arm includes a tubular member in which the drive shaft is rotatably journaled and which forms one tubular portion of the trailing arm.

27. A four-wheel vehicle as set forth in claim 26, further including a second tubular member fixed at its front end to a common member with the first-mentioned tubular member and at its rear end to an axle shaft housing that is affixed to the final drive housing.

28. A frame assembly for a four-wheel vehicle having a seat adapted to receive a rider seated in straddle-fashion thereupon, said frame assembly comprising a pair of longitudinally extending lower frame tubes, a pair of inverted generally U-shaped main frame tubes, each affixed at its opposite ends to a respective one of said lower frame tubes, and a plurality of reinforcing tubes extending thereacross said lower frame tubes and said upper frame tubes being spaced apart and extend parallel from the front end thereof to an area immediately forwardly of said seat and thereafter diverge outwardly from a longitudinally extending center plane and then continue on parallel to each other.

29. A frame assembly for a four-wheel vehicle having a seat adapted to receive a rider seated in straddle-fashion thereupon as set forth in claim 28, further including means for mounting an engine in the area where the tubes diverge outwardly from the longitudinally extending center plane.

30. A frame assembly for a four-wheel vehicle having a seat adapted to receive a rider seated in straddle-fashion thereupon as set forth in claim 29, further including a plurality of cross-tubes affixed to the main frame tubes and the lower frame tubes and supporting a centrally positioned steering shaft.

* * * * *